(12) United States Patent
Zajac et al.

(10) Patent No.: US 7,255,082 B2
(45) Date of Patent: Aug. 14, 2007

(54) ROTARY VALVE SYSTEM AND ENGINE USING THE SAME

(75) Inventors: John Zajac, San Jose, CA (US); Ian F. Smith, Sunnyvale, CA (US)

(73) Assignee: Zajac Optimum Output Motors, Inc., San Jose, CA (US)

( * ) Notice: Subject to any disclaimer, the term of this patent is extended or adjusted under 35 U.S.C. 154(b) by 0 days.

(21) Appl. No.: 11/372,978

(22) Filed: Mar. 9, 2006

(65) Prior Publication Data

US 2006/0254554 A1 Nov. 16, 2006

Related U.S. Application Data

(60) Provisional application No. 60/760,642, filed on Jan. 20, 2006, provisional application No. 60/760,641, filed on Jan. 20, 2006, provisional application No. 60/760,478, filed on Jan. 20, 2006, provisional application No. 60/660,050, filed on Mar. 9, 2005, provisional application No. 60/660,046, filed on Mar. 9, 2005, provisional application No. 60/660,045, filed on Mar. 9, 2005.

(51) Int. Cl.
*F01L 7/00* (2006.01)
*F01L 7/02* (2006.01)

(52) U.S. Cl. .............. 123/190.12; 123/80 C; 123/190.2

(58) Field of Classification Search .............. 123/80 R, 123/80 BA, 80 BB, 80 C, 190.1, 190.12, 123/190.2
See application file for complete search history.

(56) References Cited

U.S. PATENT DOCUMENTS

| | | |
|---|---|---|
| 286,803 A | 10/1883 | Fletcher |
| 871,523 A | 11/1907 | Pollock |
| 1,097,166 A | 5/1914 | Calkins |
| 1,117,095 A | 11/1914 | Rothchild |
| 1,122,529 A | 12/1914 | Moss |
| 1,147,428 A | 7/1915 | Peterson |
| 1,213,873 A | 1/1917 | Hollmann |
| 1,299,264 A | 4/1919 | Thayer |
| 1,360,107 A | 11/1920 | Fronk |
| 1,386,477 A | 8/1921 | Wallace |
| 1,578,581 A | 3/1926 | Casna |
| 1,677,460 A | 7/1928 | Pope |
| 1,740,758 A | 12/1929 | White |

(Continued)

*Primary Examiner*—Noah P. Kamen
(74) *Attorney, Agent, or Firm*—Edward S. Wright

(57) ABSTRACT

Rotary valve system for controlling communication with a port in an internal combustion engine which, in one disclosed embodiment, has a crankshaft, compression and expansion pistons connected to the crankshaft for reciprocating movement within compression and expansion chambers, a combustion chamber in which air from the compression chamber is combined with fuel and burned to produce an increased gas volume. The valve system has an outer valve member which is rotatively mounted in a bore and has an opening which moves into and out of communication with the port as the outer valve member rotates, an inner valve member rotatably mounted within the outer outer valve member with an opening at least partly overlapping the opening in the outer valve member, a flange extending along one edge of the opening in the inner valve member and through the opening in the outer valve member for sealing engagement with the wall of the bore, and means for effecting rotation of the valve members to change the degree of overlap between the openings and thereby control the timing and duration of communication between the openings and the port.

15 Claims, 5 Drawing Sheets

U.S. PATENT DOCUMENTS

| | | | |
|---|---|---|---|
| 1,808,671 A | 6/1931 | Luyckx |
| 1,890,326 A | 12/1932 | Hansen |
| 1,917,816 A | 7/1933 | Spears |
| 1,967,734 A | 7/1934 | Baker |
| 1,997,491 A | 4/1935 | Kemp |
| 2,169,631 A | 8/1939 | Cross |
| 2,183,024 A | 12/1939 | Large |
| 3,171,425 A | 3/1965 | Berlyn |
| 3,745,979 A | 7/1973 | Williams |
| 3,844,117 A | 10/1974 | Ryan |
| 3,943,895 A | 3/1976 | Howell |
| 3,948,227 A | 4/1976 | Guenther |
| 3,993,036 A | 11/1976 | Tischler |
| 4,007,725 A | 2/1977 | Weaver |
| 4,041,837 A | 8/1977 | Weidlich |
| 4,077,382 A | 3/1978 | Gentile |
| 4,198,946 A | 4/1980 | Rassey |
| 4,207,801 A | 6/1980 | Reynolds |
| 4,244,338 A | 1/1981 | Rassey |
| 4,333,427 A | 6/1982 | Burillo |
| 4,354,459 A | 10/1982 | Maxey |
| 4,381,737 A | 5/1983 | Turner |
| 4,418,658 A | 12/1983 | Diross |
| 4,473,041 A | 9/1984 | Lyons |
| 4,481,917 A | 11/1984 | Rus |
| 4,506,636 A | 3/1985 | Negre |
| 4,541,371 A | 9/1985 | Kageyama |
| 4,545,337 A | 10/1985 | Lyons |
| 4,546,743 A | 10/1985 | Eickmann |
| 4,554,890 A | 11/1985 | Okimoto |
| 4,556,023 A | 12/1985 | Giocastro |
| 4,562,796 A | 1/1986 | Eickmann |
| 4,572,116 A | 2/1986 | Hedelin |
| 4,574,749 A | 3/1986 | Negre |
| 4,592,310 A | 6/1986 | Hitomi |
| 4,622,928 A | 11/1986 | Uchinishi |
| 4,622,931 A | 11/1986 | Wickramasuriya |
| 4,714,063 A | 12/1987 | Oda |
| 4,738,233 A | 4/1988 | Hitomi |
| 4,739,737 A | 4/1988 | Kruger |
| 4,742,802 A | 5/1988 | Kruger |
| 4,776,306 A | 10/1988 | Matsuura |
| 4,821,692 A | 4/1989 | Browne |
| 4,838,220 A | 6/1989 | Parsons |
| 4,858,577 A | 8/1989 | Matsuura |
| 4,864,980 A | 9/1989 | Riese |
| 4,864,984 A | 9/1989 | Blish |
| 4,926,809 A | 5/1990 | Allen |
| 4,932,369 A | 6/1990 | Parr |
| 4,944,261 A | 7/1990 | Coates |
| 4,949,685 A | 8/1990 | Doland |
| 4,969,918 A | 11/1990 | Taniguchi |
| 4,976,227 A | 12/1990 | Draper |
| 4,976,232 A | 12/1990 | Coates |
| 4,987,864 A | 1/1991 | Cantrell |
| 4,995,354 A | 2/1991 | Morikawa |
| 5,000,131 A | 3/1991 | Masuda |
| 5,003,942 A | 4/1991 | Hansard |
| 5,205,251 A | 4/1993 | Conklin |
| 5,474,036 A | 12/1995 | Hansen |
| 5,706,775 A * | 1/1998 | Schweter et al. ...... 123/190.12 |
| 6,390,048 B1 * | 5/2002 | Luchansky ............... 123/190.1 |
| 6,578,538 B2 | 6/2003 | Trentham |
| 6,595,177 B1 | 7/2003 | Kramar |

* cited by examiner

ROTARY VALVE SYSTEM AND ENGINE USING THE SAME

RELATED APPLICATION

Provisional Application No. 60/660,045, filed Mar. 9, 2005,
Provisional Application No. 60/660,046, filed Mar. 9, 2005,
Provisional Application No. 60/660,050, filed Mar. 9, 2005,
Provisional Application No. 60/760,478, filed Jan. 20, 2006,
Provisional Application No. 60/760,641, filed Jan. 20, 2006,
Provisional Application No. 60/760,642, filed Jan. 20, 2006, the priority of which are claimed.

BACKGROUND OF THE INVENTION

1. Field of Invention

This invention pertains generally to internal combustion engines and, more particularly, to a rotary valve system and an internal combustion engine utilizing the same.

2. Related Art

Although widely used in automotive engines and other internal combustion engines, conventional poppet valves have a number of limitations and disadvantages. With the strong springs required to close them and hold them shut and the camshafts, rocker arms, and/or other mechanism required to open them, standard valve trains can require a significant portion of an engine's output to operate them.

Since poppet valves usually extend into the firing chambers when open, they can limit the minimum chamber volume and thus prevent an engine from having maximum volumetric efficiency, and measures must be taken to ensure that the valves do not collide with the pistons. Valve float can also be a problem, and if a valve ever does get sucked into a cylinder, it can destroy the engine. Poppet valves may require periodic adjustment, and typically have relatively large heads which can obstruct the flow of both the fuel mixture and the exhaust gases. In addition, it is very difficult to vary the valve timing with poppet valves.

Heretofore, there have been attempts to use rotary valves and electronically controlled valves instead of poppet valves in internal combustion engines. However, they also have had limitations and disadvantages which have limited their usefulness.

OBJECTS AND SUMMARY OF THE INVENTION

It is in general an object of the invention to provide a new and improved rotary valve system and an internal combustion engine utilizing the same.

Another object of the invention is to provide a rotary valve system and engine of the above character which overcome limitations and disadvantages of valve systems and engines heretofore provided.

These and other objects are achieved in accordance with the invention by providing a rotary valve system for controlling communication with a port in an internal combustion engine. The valve system has a first rotary valve member with an opening which comes into registration with the port during part of each revolution of the valve member, a second rotary valve member disposed concentrically of the first valve member and having an opening which at least partly overlaps with the opening in the first valve member, a flange extending from one of the valve members into the opening in the other valve member, and a control for adjusting the relative rotational positions of the valve members to change the degree of overlap between the openings and thereby control the timing and/or duration of communication between the openings and the port. In some embodiments, the first valve member is an outer sleeve which is rotatively mounted in a bore, and the second valve member, which can be either a solid body or a sleeve, is rotatively mounted in the outer sleeve, with the flange extending through the opening in the outer sleeve and into sealing engagement with the wall of the bore.

In an embodiment for controlling communication between ports in two chambers of an internal combustion engine, the first valve member has first and second openings that move into and out of communication with the two ports, the second valve member has first and second openings which at least partly overlap with respective ones of the first and second openings in the first valve member, and the control adjusts the relative rotational positions of the valve members to change the degree of overlap between the openings and thereby control the timing and duration of communication between the two chambers.

The valves are typically driven from the crankshaft or other output shaft of the engine, with the opening in the first valve member defining a variable window in which valve can be open. The relative rotational positions of the two valve members are adjusted to control the overlap of the openings and, hence, when the valve opens or closes and how long it remains open. In some embodiments, the timing of the first valve member is fixed relative to the position of the crankshaft and/or a piston, and the position of the second valve member is adjusted to vary the valve timing.

In one disclosed embodiment, the valve system is shown in conjunction with an engine having compression and expansion chambers, a separate combustion chamber in which air from the compression chamber is combined with fuel and burned to produce an increased gas volume, an intake valve for controlling air flow to the compression chamber, and outlet valve for controlling air flow from the compression chamber to the combustion chamber, an inlet valve for controlling communication between the combustion chamber and the expansion chamber, and an exhaust valve for controlling exhaust gas flow from the expansion chamber. In that particular embodiment, all four of the valves incorporate the invention. The valve system is not, however, limited to engines of that type, and it can also be used in conventional internal combustion engines, including engines in which combustion takes place in the same cylinders or chambers as compression and expansion.

Increased flow for low pressure gases can be provided by making the openings in valves where pressure is lower wider than the openings in valves where pressure is higher. Thus, in the embodiment discussed above, the intake valve has wider openings for allowing gas that is at or near atmospheric pressure to enter the compression chamber from an intake manifold, and the outlet valve has narrower openings for allowing high pressure gas to flow to the combustion chamber. Similarly, the inlet valve has narrower openings for allowing high pressure gas to enter the expansion chamber from the combustion chamber, and the exhaust valve has wider openings for allowing gas that is at or near atmospheric pressure to be exhausted from the expansion chambers.

In embodiments where the engine has a plurality of compression and/or expansion chambers, the valve members can be ganged together, with a single valve member serving more than one chamber. Thus, for example, in an engine having a plurality of compression chambers, a common outer sleeve with openings in different positions to provide the outlet valve for each of them, with independently adjustable valve members within the sleeves for varying the timing and duration of each of the valves. Common valve members can also be used for different types of chambers, such as a compression chamber and an expansion chamber.

In some disclosed embodiments, relative rotation between the valve members is effected by a gear system which, in one embodiment, includes a first drive gear affixed to one of the inner valve member, a second drive gear affixed to the outer valve member, and a variable gear train interconnecting the drive gears for rotation in unison while permitting the drive gears to be advanced and retarded relative to each other.

In other disclosed embodiments, relative rotation between the valve members is effected by an endless drive element, such as a toothed belt or a chain, trained about a drive wheel and a wheel connected to one of the valve members with runs of the drive element between the wheels on opposite sides of the wheel connected to the one valve member, and means for differentially varying the relative lengths of the runs to advance and retard the one valve member relative to the drive wheel.

DETAILED DESCRIPTION

Figure 1:
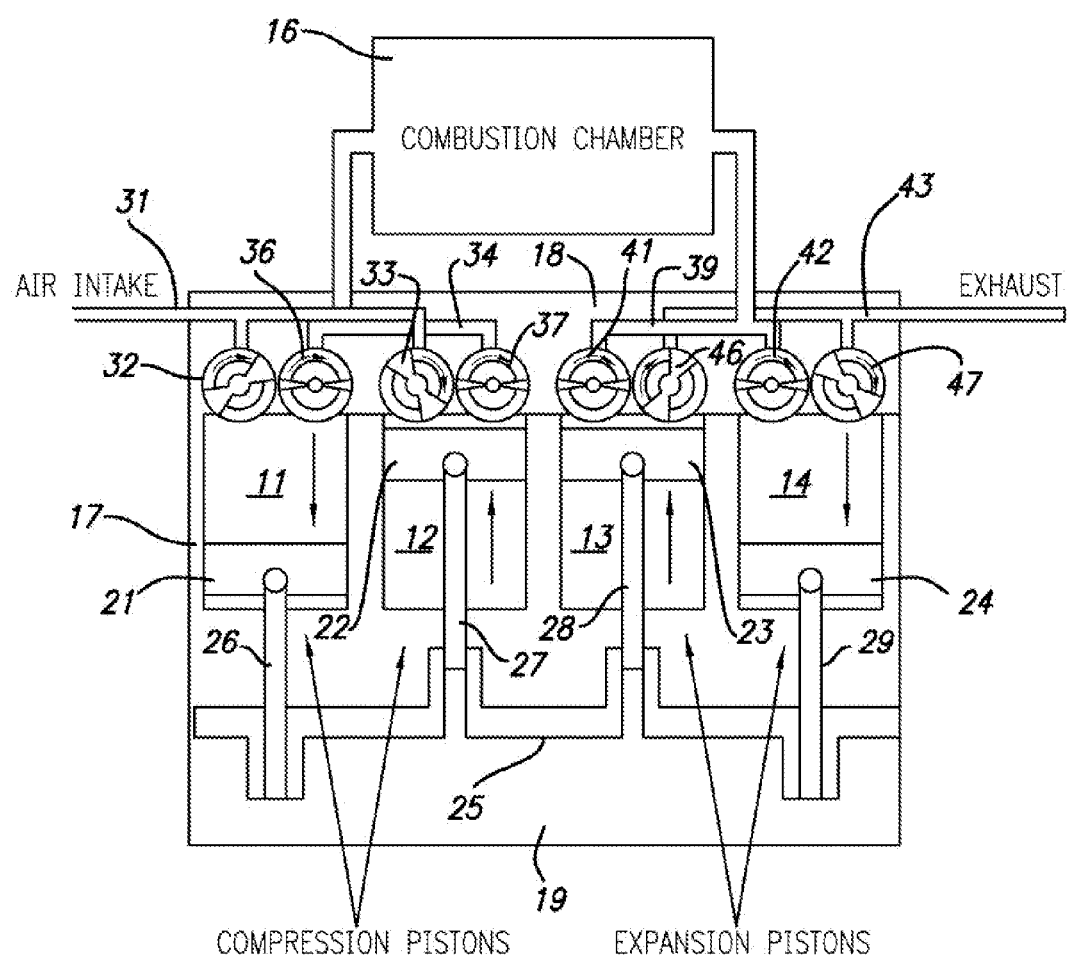
FIG. 1 is a vertical sectional view, somewhat schematic, of one embodiment of an internal combustion engine with a rotary valve system incorporating the invention.

In the drawings, the invention is illustrated in conjunction with a four cylinder internal combustion engine which is described in greater detail in copending application Ser. No. 11/372,751, filed of even date, the disclosure of which is incorporated herein by reference. That engine has a pair of compression cylinders 11, 12 and a pair of expansion cylinders 13, 14 connected to opposite ends of a combustion chamber 16 which can, for example, be of a type disclosed in copending application Ser. No. 11/372,737, filed of even date, the disclosure of which is incorporated herein by reference. The cylinders are formed in an engine block 17, with the upper ends of the cylinders being closed by a cylinder head 18 and the lower ends of the cylinders opening into a crankcase 19 in the lower portion of the engine block.

Reciprocating pistons 21-24 are mounted in the cylinders and connected to a crankshaft 25 by connecting rods 26-29, with pistons 21, 22 serving as compression pistons in cylinders 11, 12 and pistons 23, 24 serving as expansion pistons in cylinders 13, 14. For good balance, the two outer pistons (compression piston 21 and expansion piston 24) move up and down together, as do the two inner pistons (compression piston 22 and expansion piston 23), with the two groups being substantially 180 degrees out of phase with each other.

Although a four cylinder engine is shown, the valves will work with any number of cylinders in any internal combustion engine, and they can also be used in other valving applications, such as steam engines, where variable valve timing is desired.

Compression cylinders 11, 12 receive fresh air through an intake manifold 31, with intake valves 32, 33 controlling communication between the manifold and the cylinders. Cylinders 11, 12 also communicate with the inlet end of combustion chamber 16 via a manifold 34, with communication between the cylinders and that manifold being controlled outlet valves 36, 37. The outlet end of combustion chamber 16 communicates with expansion cylinders 13, 14 via a manifold 39, with inlet valves 41, 42 controlling communication between the chamber and those cylinders. Exhaust gases are expelled from the expansion cylinders through an exhaust manifold 43, with communication between the cylinders and the manifold being controlled by exhaust valves 46, 47.

Air is drawn into the compression chambers on the downstroke of pistons 21, 22, then compressed and thereby heated on the upstroke of the pistons and injected into the inlet end of combustion chamber 16. In the combustion chamber, the hot, compressed air mixes with fuel introduced into the chamber through a fuel inlet to form a mixture which burns and produces a volumetric increase throughout the chamber. The expanding gases leaving the combustion chamber drive pistons 23, 24 in a downward direction in the expansion cylinders, and spent gases are expelled through exhaust manifold 43 on the upstroke of those pistons.

In one presently preferred embodiment, the sizing of the compression and expansion cylinders, the movement of the pistons within the cylinders, and the timing of the valves are such that the pressure within the combustion chamber remains substantially constant throughout the operating cycle of the engine, although some pressure spiking can occur and may even be desirable in some cases.

Figure 2:
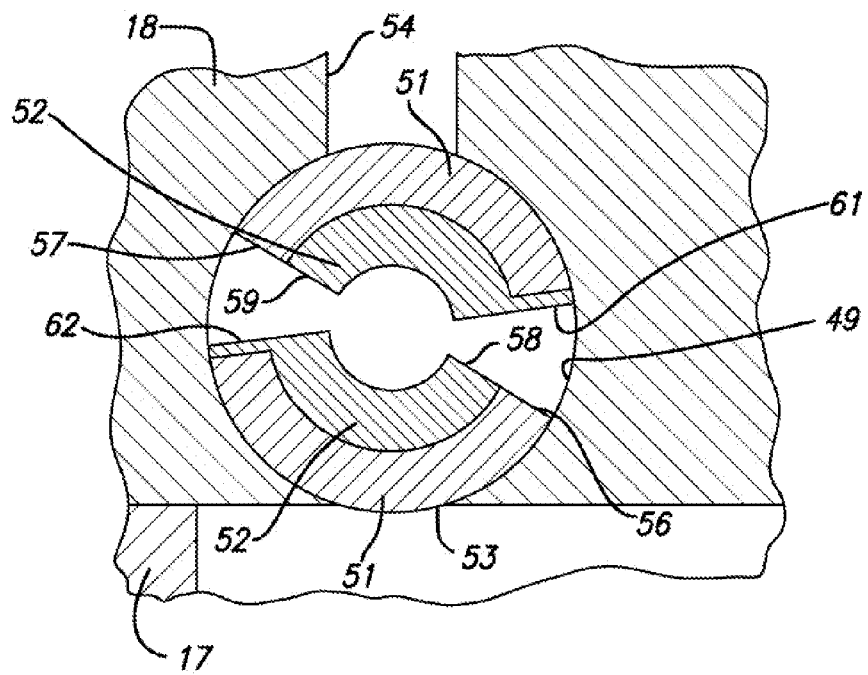
FIG. 2 is an enlarged cross-sectional view of one of the valve assemblies in the embodiment of FIG. 1.

As best seen in FIG. 2, each of the valves has an outer sleeve 51 which is rotatively mounted in a bore 49 in cylinder head 18 and an inner valve member 52 which is rotatively mounted in the outer sleeve. In the embodiment illustrated, the inner valve member is also a sleeve, but it could be a solid body, if desired. The bore opens through the lower side of the head to form a port 53 in communication with the cylinder below, a manifold passageway 54 communicates with the bore on the side opposite the port.

The outer sleeve has a pair of diametrically opposed slotted openings 56, 57 which move into and out of registration with port 53 and passageway 54 as the sleeve rotates. Inner valve member 52 also has a pair of diametrically opposed slotted openings 58, 59, with a radial lip or flange 61, 62 extending along one edge of each of the openings in the inner member and through one of the openings in the outer sleeve for sealing engagement with the wall of the bore.

The openings in outer sleeve 51 define a window during which the valve can be open. This window corresponds to the period of time during which one of the openings in the outer sleeve is aligned with the port 53 and the other is aligned with the manifold passageway 54. The valve is actually open only when the openings in inner valve member 52 also align with port 53 and manifold passageway 54. The position of the inner valve member 52 relative to the outer sleeve 51 is varied to control when the valve opens or closes and how long it remains open during the window.

In some applications, it may be desirable to have the openings offset radially from each other, rather than being aligned diametrically. Offsetting the openings will limit the flow through them to some extent but will permit the valves to remain open for a longer time than when the openings are aligned.

It may also be desirable in some applications to make lip seals 61, 62 in a way such that the valve is not completely closed in its most closed position. That can be done, for example, by forming grooves in the sealing surfaces or by putting stops on the seals to prevent the valve from closing fully. This can be useful during very low load conditions such as compression release engine braking, commonly known as "Jake braking", where it can be beneficial to have a small amount of air enter the combustion chamber and burn. This will keep the combustion chamber hot and ready for use even after long periods of very low load conditions. In addition, the small flow of air may help avoid overpressure conditions in the event of a control failure.

In the embodiment illustrated in FIG. 1, the side walls of the slotted openings lie in radial planes, and the openings in the valves where pressure is lower are shown as being wider than the openings in the valves where pressure is higher. Thus, in this example, the intake valves have wider openings for allowing gas that is at or near atmospheric pressure to enter the compression chambers from an intake manifold, the outlet valves have narrower openings for allowing high pressure gas to flow to the combustion chamber. Similarly, the inlet valves have narrower openings for allowing high pressure gas to enter the expansion chambers from the combustion chamber and wider openings for allowing gas that is at or near atmospheric pressure to be exhausted from the expansion chambers.

The outer sleeve is driven from the crankshaft by suitable means such as gears, belts or chains, and means is provided for rotating the inner valve member relative to the outer sleeve to change the degree of overlap between the openings and thereby control the timing and duration of communication between the openings and the port.

Figure 3:
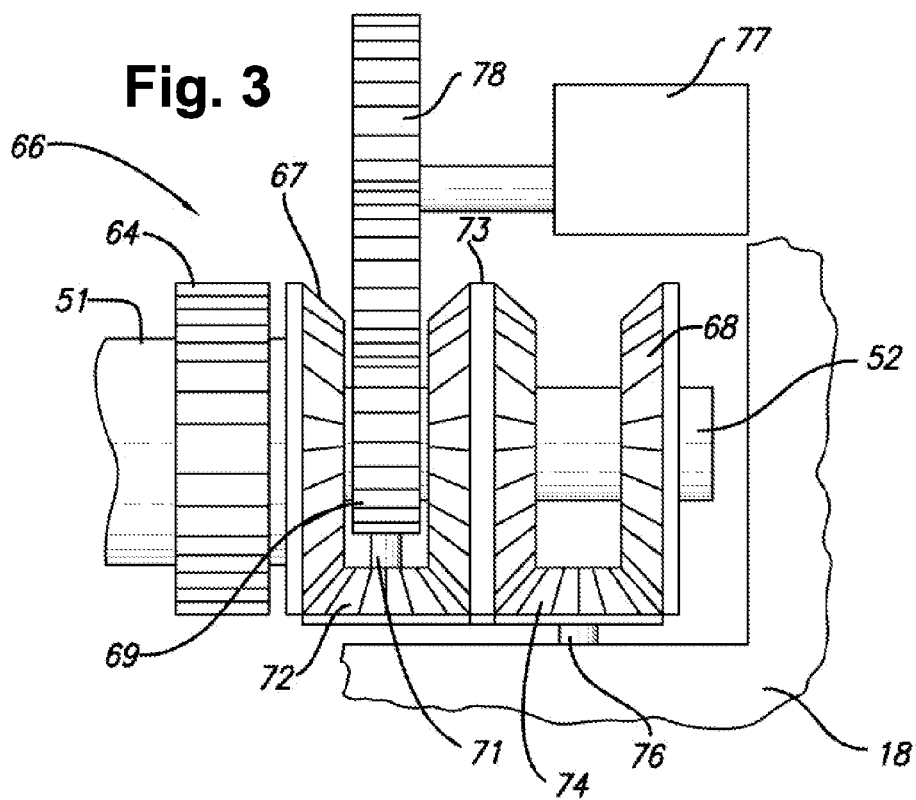
FIG. 3 is a plan view of one embodiment of a gear driven system for adjusting the timing and duration of the valve openings in the embodiment of FIG. 1.

In the embodiment shown in FIG. 3, a drive gear 64 is mounted on outer sleeve 51 and driven from the crankshaft through a gear train (not shown) which, in this example, provides a 2:1 reduction in speed between the crankshaft and the valve so that the valve makes one revolution for each two revolutions of the crankshaft. During one revolution of the crankshaft, openings 56, 58 are aligned with port 53 and openings 57, 59 are aligned with passageway 54, and during the next revolution, openings 57, 59 are aligned with the port and openings 56, 58 are aligned with the passageway.

A variable gear train 66 interconnects the two valve members for rotation in unison while permitting inner sleeve 52 to be advanced and retracted relative to outer sleeve 51. This train includes drive gears 67, 68 which are affixed to respective ones of the two sleeves, and a timing gear 69 which is mounted on inner sleeve between the drive gears and is free to rotate about that sleeve. An axle 71 extends in a radial direction from timing gear 69 and carries a planetary gear 72 which meshes with drive gear 67 on outer sleeve 51 and with an idler gear 73 which is rotatively mounted on inner sleeve. Idler gear 73 is a double bevel gear and is coupled to drive gear 68 by another idler gear 74 which rotates about a radially extending axle 76 mounted on cylinder head 18. Timing gear 69 is driven by a stepping motor 77 and a drive gear 78 on the motor shaft.

As outer sleeve 51 is driven by the crankshaft, inner sleeve 52 rotates in unison with it as long as timing gear 69 remains stationary, with the rotation being coupled from drive gear 67 to drive gear 68 by planetary gear 72 and idler gears 73, 74. In that regard, it will be noted that planetary gear 72 drives idler gear 73 at the same speed as drive gear 67, but in the opposite direction, and that idler gear 74 reverses the direction again so that drive gear 68 turns at the same speed and in the same direction as drive gear 67.

When timing gear 69 is rotated by positioning motor 77, axle 71 and the planetary gear carried by it precess about the axis of the sleeves. As the planetary gear moves relative to drive gear 67, it turns about its axis, and that rotation is imparted to idler gear 73 to advance or retard that gear relative to drive gear 67. That movement is reversed and transferred to drive gear 68 and, hence, to inner sleeve 52 by idler gear 74.

Figure 4A:
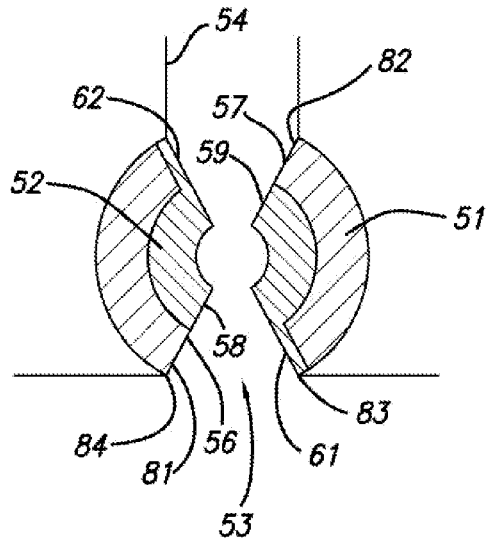
FIGS. 4A and 4B are cross-sectional views similar to FIG. 2, showing the valve members in different operative positions.

By advancing and retarding the position of inner sleeve 52 relative to outer sleeve 51, the timing and duration of the valve opening can be controlled. Thus, in FIG. 4A, the sleeves are shown with openings 58, 59 fully aligned with or overlapping openings 56, 57, which maximizes the duration of the valve opening. With the sleeves in this position, lips or flanges 61, 62 extending along the trailing edges of openings 58, 59, and the sleeves rotating in a clockwise direction, the valve opens when the leading edges 81, 82 of openings 56, 57 reach the near edge 83 of port 53 and close when flanges 61, 62 reach the far edge 84 of the port.

Figure 4B:
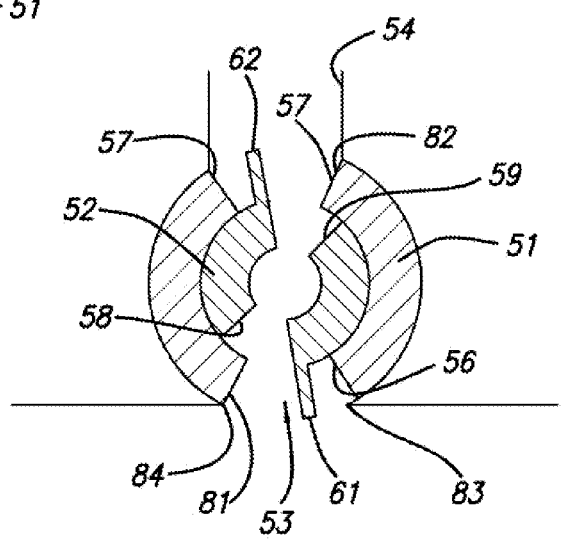

When inner sleeve 52 is advanced relative to outer sleeve 51, as illustrated in FIG. 4B, the valve still opens when the leading edges of openings 56, 57 reach the near edge of the port and closes when flanges 61, 62 reach the far edge. However, the flanges will reach the far edge at an earlier point in the rotation of the outer sleeve, so the valve remains open for a shorter period of time and closes sooner.

If the flanges or lips are positioned along the leading edges of openings 58, 59, rather than the trailing edges and the valve still rotates in the same direction, then the valve will open when the flanges reach the near edge of the port and close when the trailing edges of openings 56, 57 reach the far edge. In that case, the opening point is adjustable and the closing point is fixed.

If desired, a similar system can also be utilized to advance and retard the outer sleeves relative to the crankshaft to provide independently variable opening times and closing times for the valves. This provides an unprecedented level of control for a wide range of engine loads and conditions.

Figure 5:
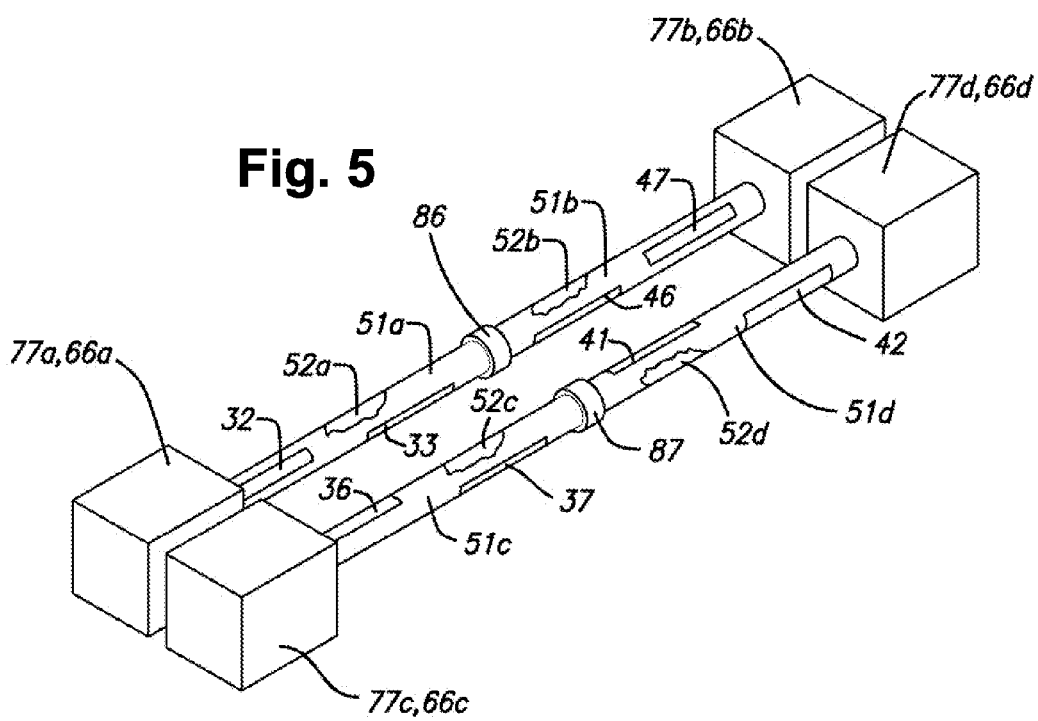
FIG. 5 is an isometric view, partly broken away, of the valve assembly in the embodiment of FIG. 1.

FIG. 1 is schematic in that for purposes of illustrating the two valves in each cylinder and their positions relative to the pistons, the valves are shown as extending crosswise of the engine, whereas in that particular embodiment they actually extend in a lengthwise direction as shown in FIG. 5.

Thus, in the four cylinder engine of FIG. 1, the valves are aligned along two parallel axes which extend side-by-side above the cylinders, with four valves along each and the number of valves being dependent on the number of cylinders. In the embodiment illustrated, each outer sleeve and each inner sleeve serves two valves, with the two outer sleeves on each side being connected together at their inner ends for rotation in unison. The inner sleeves rotate independently of each other, but are coupled at their outer ends to the outer sleeves in the manner described above, with a separate positioning motor for each. Each pair of intake, outlet, inlet, and exhaust valves has an independent drive mechanism to allow independent control of each type of valve.

As shown in FIG. 5, outer sleeves 51*a* and 51*b* are connected together at their inner ends by a coupling 86, with positioning motors 77*a*, 77*b* and gear trains 66*a*, 66*b* for adjusting the relative positions of the inner sleeves. Likewise, outer sleeves 51*c*, 51*d* are connected together at their inner ends by a coupling 87, with positioning motors 77*c*, 77*d* and gear trains 66*c*, 66*d* for adjusting the relative positions of the sleeves in them. In this embodiment, the air intake valves 32, 33 for compression cylinders 11, 12 are formed by outer sleeve 51*a* and inner sleeve 52*a*, the outlet valves 36, 37 for compression cylinders 11, 12 are formed by outer sleeve 51*c* and inner sleeve 52*c*, the inlet valves 41, 42 for expansion cylinders 13, 14 are formed by outer sleeve 51*d* and inner sleeve 52*d*, and the exhaust valves 46, 47 for expansion cylinders 13, 14 are formed by outer sleeve 51*b* and inner sleeve 52*b*.

Figure 6:
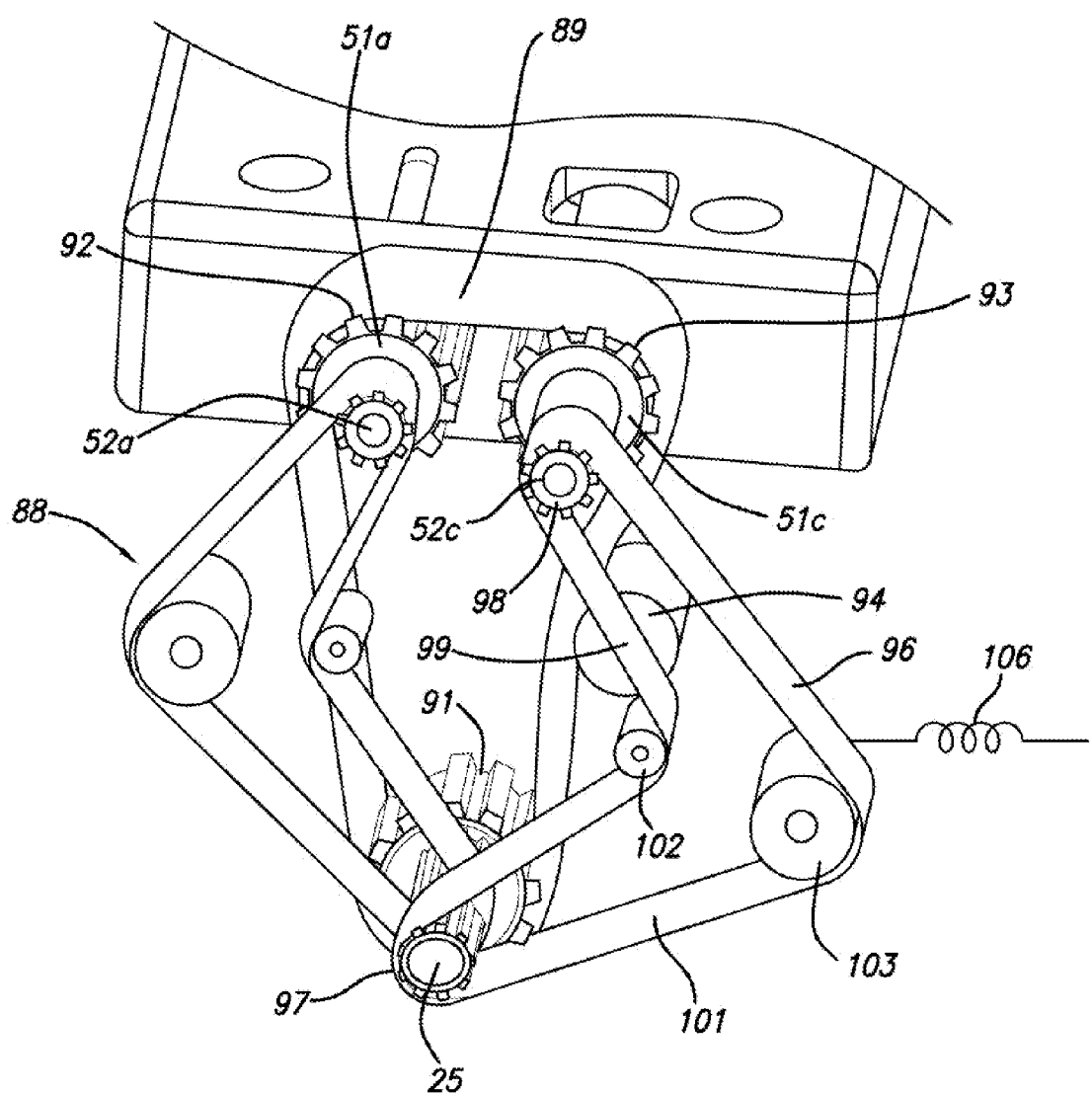
FIG. 6 is an isometric view of one embodiment of a belt driven system for adjusting the timing and duration of the valve openings in the embodiment of FIG. 1.

In the embodiment of FIG. 6, the valve system is driven from the crankshaft of the engine by means of a belt or chain system 88 which permits the inner valve members to be advanced and retarded relative to the outer sleeves. The valve system and engine are similar those in the embodiment of FIG. 5, but without the gear trains and positioning motors for controlling the valve timing. The drive system is shown for the valves at one end of the engine only, it being understood that a similar system is also provided for the valves at the other end.

Outer sleeves 51*a*, 51*c* are driven by an endless drive element in the form of a toothed drive belt or chain 89 which is trained about a cog wheel or sprocket 91 on crankshaft 25 and about cog wheels or sprocket 92, 93 on the outer sleeves, with an idler wheel or sprocket 94 for maintaining proper tension in the belt.

Each of the inner valve members 52*a*, 52*c* is driven by an endless drive element such as a toothed drive belt or chain 96 which is trained about cog wheels or sprockets 97, 98 on the crankshaft and valve member, with means for differentially adjusting the relative lengths of the runs of the belt or chain 99, 101 between the cog wheels or sprockets. In the embodiment illustrated, this means comprises a pair of idler wheels or sprockets 102, 103 which can be moved back and forth in a direction generally perpendicular to the runs. By simultaneously moving idler wheel or sprocket 102 to the left and idler wheel or sprocket 103 to the right, the length of run 99 is decreased and the length of run 101 is increased. With drive pulleys or sprockets 91 and 97 locked together on the crankshaft, the shift in the belt or chain causes cog wheel or sprocket 98 and inner valve member 52*c* to advance in a clockwise direction relative to outer sleeve 51*c*. The inner valve member 52*c* can be shifted in a counter-clockwise direction, or retarded, by moving idler wheel or sprocket 102 to the right and idler wheel or sprocket 103 to the left, which increases the length of run 99 and decreases length of run 101.

If one of the idler wheels or sprockets is spring-loaded toward its extended position (i.e., the position which increases the length of the run trained about it), it is only necessary to adjust the position of the other idler wheel or sprocket in order to adjust the valve timing. Thus, for example, with idler wheel or sprocket 103 biased toward its extended position, as illustrated schematically by spring 106, valve member 52*c* can be advanced simply by moving idler wheel or sprocket 102 to the left and retarded by moving idler wheel or sprocket 102 to the right. As idler wheel or sprocket 102 moves to the left, the spring moves idler wheel or sprocket 103 to the right, thereby increasing the length of run 101 relative to run 99. When idler wheel or sprocket 102 moves to the right and increases the length of run 99, the spring allows idler wheel or sprocket 103 to move to the left with a corresponding decrease in the length of run 101.

If desired, a similar system of idler wheels or sprockets can be utilized to change the relative lengths of the belt 89 which is trained about the cog wheels or sprockets 92, 93 affixed to the outer valve members or sleeves 51*a*, 51*c* to provide independently variable opening times and closing times for the valves.

The timing of the valves can be controlled by a control system such as that disclosed in Ser. No. 11/372,751, filed of even date, the disclosure of which is incorporated herein by reference. Such a system has sensors for monitoring temperature and pressure in the chambers and in other parts of the engine and a computer or other controller for controlling actuators that move the idler wheels or sprockets to adjust the timing of the valves in accordance with temperature, pressure, load and other operating conditions.

Figure 7:
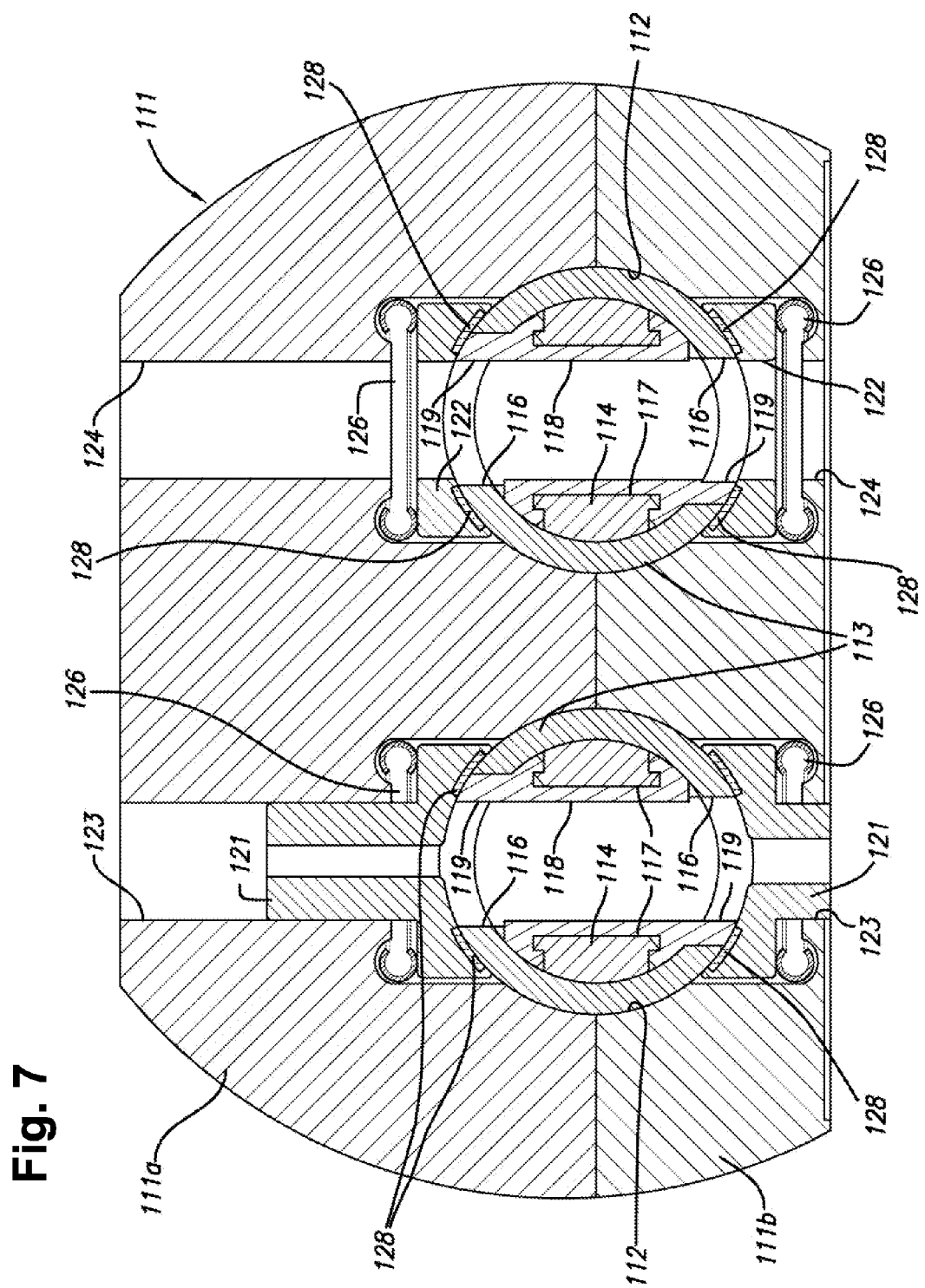
FIG. 7 is an enlarged fragmentary cross-sectional view of the cylinder head of an engine similar to the embodiment of FIG. 1, illustrating the manner in which the valve members are sealed.

In the embodiment of FIG. 7, cylinder head 111 is split horizontally into two sections 111*a* and 111*b*, with circular valve bores 112 formed partially in each of the two sections. Outer valve sleeves 113 are rotatively mounted in the bores and inner valve members 114 are rotatively mounted within the sleeves. The sleeves have slotted openings 116 on opposite sides thereof, and the valve members have generally cylindrical bodies with openings 117 extending through the bodies. Inserts 118 are mounted in openings 117 and provide seals between the valve members and sleeves. The inserts also extend through the slotted openings in the sleeves to form lips or flanges 119 which extend through the openings in the outer sleeves and form seal with the bores.

Bores 112 are formed in part by inserts 121, 122 which are mounted in vertically extending bores 123, 124 that intersect the valve bores and form ports for the valves. Bores 123, 124 are stepped, and the inserts are mounted in enlarged sections of the bores above and below the valve sleeves, with C-ring seals 126 between the inserts and the shoulders of the bores in which they are mounted. With their C-shaped cross section, seals 126 are flexible enough to provide a spring force which holds the inserts and sleeves together and also provide compensation for thermal expansion and wearing of the parts. Seals 128 provide sealing between the inserts and the sleeves. The inserts can be fabricated of a ceramic material or any other suitable material.

The lower portions of bores 123, 124 communicate directly with the cylinder (not shown) beneath the valves, and the upper portions of the bores communicate with the manifolds.

The inserts and seals are installed along with the valves while the two sections of the head are apart, and they are retained in place by the head when it is assembled. As in the embodiment of FIG. 1, valve sleeves 113 are free to rotate within bores 112, with the positions of valve members 114 being adjustable relative to sleeves 113 to vary the timing and duration of the valve openings.

Since the valves do not extend into the cylinders when they open, they do not prevent the pistons from traveling all the way to the tops of the cylinders like poppet valves do, even when they are open. Hence, the only limitation to full piston travel is the need for a small tolerance or clearance to prevent the pistons from striking the head due to thermal expansion or extension at higher engine speeds. This clearance can, for example, be on the order of about 0.010 inch to 0.200 inch, and typically does not need to be more than about 0.015 inch. Hence, the minimum volumes of the cylinders can be much closer to zero than they are in other engines.

Although a rotary valve has the ability to open when the piston is at top dead center (TDC) and close when the piston at bottom dead center (BDC), that may not be the best way to operate the valves in a given engine since it can result in compressed gases being blown out through the intake and/or exhaust manifolds. In an engine of the type shown in FIG. 1, for example, opening the intake valve at top dead center would allow compressed air to escape, thereby wasting the work done in compressing it and compromising the efficiency of the engine.

It is, therefore, preferable to retard the opening of the intake valve until the air in the cylinder has expanded enough to be at or near atmospheric pressure. In this way, the work done to compress the gas is recovered as the gas pushes against the piston at the top of its downstroke.

For example, an engine with a 12.5:1 compression ratio and a 3.76" stroke may have a 0.015" clearance between the crown of the piston and the cylinder head. If the intake valve were opened at TDC, gas at a pressure of 504 p.s.i. would escape and be wasted. If, however, the opening of the intake valve is delayed until the piston has moved down to the point where the gas has expanded to 12.5 times the volume at TDC, then the pressure of the gas above the piston would be at or near atmospheric, no gas would be lost out the intake valve, and the engine would still have the same amount of air in the cylinder at BDC even with the delayed opening of the intake valve.

In the foregoing example, the volume of the gas has expanded to 12.5 times the TDC volume when the piston has traveled 11.5×0.015", or 0.173", which is 4.6 percent of the 3.76" stroke and 21.5 degrees of crankshaft rotation. With this delayed opening, the slotted openings 56, 57 in the intake valves can be substantially narrower, with the leading edges of the openings being moved back.

The invention has a number of important features and advantages. Prior attempts at building rotary valves with an adjustable inner member within an outer sleeve were not successful because of leakage between the inner member and the outer sleeve. The invention overcomes that problem with the sealing lip or flange which extends from the inside of the inner member to the outside of the sleeve, thereby preventing leakage between the two members. This provides a truly variable valve opening or closing without major leaks. Either the opening positions or the closing positions of the valves can be adjusted, depending upon which side of the openings the sealing flanges or lips are on, and the opening or closing positions can be adjusted by as much as 180 degrees. Thus, the opening positions can be adjusted without affecting the closing positions, or the closing positions can be adjusted without affecting the opening positions. All of the valves can be adjusted independently and while the engine is running. The full adjustability of the valve system permits constant matching of engine performance over a wide range of engine load and speed.

Since the inner member and the outer sleeve rotate together except when the load and speed of the engine change, there is very little wear between the parts. With less wear, the valves can use dry lubrication rather than liquid lubrication, thereby avoiding the problem of oil leaking into cylinders and fouling plugs and/or building up carbon deposits. Without oil, the parts can run hotter, which reduces heat loss and improves efficiency. It also reduces oil burning and eliminates pollution due to the burning of oil in the valve system.

Since there are no springs, the valves cannot float, and engine speed and power are not compromised at higher RPM as they are with conventional valves. Eliminating the springs also reduces the power necessary to run the valve train, which further increases the available horsepower and efficiency of the engine. Moreover, the rotary valves allow the engine to operate at higher RPM than one with reciprocating valves.

The rotary valves of the invention are not constrained by the space limitations of round poppet valves and can have large, rectangular ports which provide significantly greater flow and also improve engine efficiency. It is also beneficial not to have to force gases around the mushroom shaped heads of poppet valves.

Since the valves do not extend into the cylinders, they do not prevent the pistons from traveling all the way to the tops of the cylinders like poppet valves do, and there is no danger of the valves colliding with the pistons in the event of a mechanical malfunction. This permits full utilization of the cylinder volume and provides both high volumetric efficiency and high engine efficiency.

Although the invention has been disclosed with specific reference to an engine having a separate chamber in which combustion occurs, the valve system can also be utilized advantageously in internal combustion engines where combustion takes place in the same chambers as compression and expansion. In addition to being adjustable, the system has fewer moving parts than a poppet valve system, and the rotary valves take less work to operate than poppet valves. The system requires less space than a poppet valve system. The valves can open and close faster than poppet valves and can also operate at higher engine speeds, or RPM. Moreover, there is no danger of valve float, and engine breathing is better than with conventional valve systems. Hence, the system will improve the fuel efficiency of and reduce pollution from such engines.

It is apparent from the foregoing that a new and improved rotary valve system and an engine utilizing the same have been provided. While only certain presently preferred embodiments have been described in detail, as will be apparent to those familiar with the art, certain changes and modifications can be made without departing from the scope of the invention as defined by the following claims.

The invention claimed is:

1. A rotary valve system for controlling communication with a port in an internal combustion engine, comprising: an outer valve member which is rotatively mounted in a bore and has an opening which moves into and out of communication with the port as the outer valve member rotates, an inner valve member rotatably mounted within the outer valve member with an opening at least partly overlapping the opening in the outer valve member, a flange extending along one edge of the opening in the inner valve member and through the opening in the outer valve member for sealing engagement with the wall of the bore, and means for effecting relative rotation between the valve members to change the degree of overlap between the openings and thereby control the timing and duration of communication between the openings and the port.

2. The rotary valve system of claim 1 wherein the outer valve member is a sleeve.

3. The rotary valve system of claim 2 wherein the inner valve member is also a sleeve.

4. An internal combustion engine having compression and expansion pistons constrained for reciprocating movement within compression and expansion chambers, a combustion chamber in which air from the compression chamber is combined with fuel and burned to produce an increased gas volume, an intake valve for controlling air flow to the compression chamber, and outlet valve for controlling air flow from the compression chamber to the combustion chamber, an inlet valve for controlling communication between the combustion chamber and the expansion chamber, and an exhaust valve for controlling exhaust gas flow from the expansion chamber, at least one of the valves comprising an outer valve member which is rotatively mounted in a bore and has an opening which moves into and out of communication with the chamber as the outer valve member rotates, an inner valve member rotatably mounted within the outer valve member with an opening at least partly overlapping the opening in the outer valve member, a flange extending along one edge of the opening in the inner valve member and through the opening in the outer valve member for sealing engagement with the wall of the bore, and means for effecting relative rotation between the valve members to change the degree of overlap between the openings and thereby control the timing and duration of communication between the openings and the chamber.

5. The rotary valve system of claim 4 wherein the outer valve member is a sleeve.

6. The internal combustion engine of claim 4 wherein the inner valve member is also a sleeve.

7. The internal combustion engine of claim 4 including means for opening the intake valve when pressure in the compression cylinder is at or near atmospheric pressure.

8. An internal combustion engine having a cylinder, crankshaft, a piston connected to the crankshaft for reciprocating movement within the cylinder, an outer valve member rotatively mounted in a bore with an opening in the outer valve member which moves into and out of communication the cylinder as the outer valve member rotates, an inner valve member rotatably mounted within the outer valve member with an opening at least partly overlapping the opening in the outer valve member, a flange extending along one edge of the opening in the inner valve member and through the opening in the outer valve member for sealing engagement with the wall of the bore, and means for effecting relative rotation between the valve members to change the degree of overlap between the openings and thereby control the timing and duration of communication between the openings and the cylinder.

9. The rotary valve system of claim 8 wherein the outer valve member is a sleeve.

10. The internal combustion engine of claim 9 wherein the inner valve member is also a sleeve.

11. An internal combustion engine having a chamber of variable volume, an outer valve member which is rotatively mounted in a bore and has an opening which moves into and out of communication with the chamber as the outer valve member rotates, an inner valve member rotatably mounted within the outer valve member with an opening at least partly overlapping the opening in the outer valve member, a flange extending along one edge of the opening in the inner valve member and through the opening in the outer valve member for sealing engagement with the wall of the bore, and means for effecting relative rotation between the valve members to change the degree of overlap between the openings and thereby control the timing and duration of communication between the openings and the chamber.

12. The rotary valve system of claim 11 wherein the outer valve member is a sleeve.

13. The internal combustion engine of claim 12 wherein the inner valve member is also a sleeve.

14. A rotary valve system for controlling communication with a port in an internal combustion engine, comprising:
   a first rotary valve member having an opening which comes into registration with the port during part of each revolution of the valve member;
   a second rotary valve member disposed concentrically of the first valve member and having an opening which at least partly overlaps with the opening in the first valve member;
   a flange extending from one of the valve members into the opening in the other valve member; and
   a control for adjusting the relative rotational positions of the valve members to change the degree of overlap between the openings and thereby control the timing and duration of communication between the openings and the port.

15. The rotary valve system of claim 14 wherein the valve members are mounted in a bore, and the flange extends through the opening in the other valve member into sealing engagement with a wall of the bore.

* * * * *